United States Patent
Huang

(10) Patent No.: US 9,423,888 B2
(45) Date of Patent: Aug. 23, 2016

(54) OBJECT NAVIGATING APPARATUS AND OBJECT NAVIGATING METHOD

(71) Applicant: PixArt Imaging Inc., Hsin-Chu (TW)

(72) Inventor: Yu-Hao Huang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 173 days.

(21) Appl. No.: 14/251,653

(22) Filed: Apr. 14, 2014

(65) Prior Publication Data

US 2014/0333539 A1  Nov. 13, 2014

(30) Foreign Application Priority Data

May 7, 2013 (TW) .............................. 102116241 A

(51) Int. Cl.
| | |
|---|---|
| *G06F 3/041* | (2006.01) |
| *G06F 3/0354* | (2013.01) |
| *G06F 3/0488* | (2013.01) |
| *G06F 3/038* | (2013.01) |

(52) U.S. Cl.
CPC ............ *G06F 3/03543* (2013.01); *G06F 3/038* (2013.01); *G06F 3/0414* (2013.01); *G06F 3/0488* (2013.01)

(58) Field of Classification Search
CPC . G06F 3/03543; G06F 3/0414; G06F 3/0488; G06F 3/038; G06F 3/0416
USPC .................................................. 345/175, 163
See application file for complete search history.

(56) References Cited

U.S. PATENT DOCUMENTS

| | | | | |
|---|---|---|---|---|
| 7,324,088 | B2* | 1/2008 | Lin ........................ | G06F 3/0317 345/163 |
| 8,751,949 | B2* | 6/2014 | Hammoud ............ | G06F 3/0488 345/159 |
| 2005/0001153 | A1* | 1/2005 | Lauffenburger ...... | G06F 3/0317 250/221 |
| 2005/0001817 | A1* | 1/2005 | Lauffenburger ...... | G06F 1/3259 345/166 |
| 2008/0062131 | A1* | 3/2008 | Chan ..................... | G06F 3/0317 345/166 |
| 2008/0174787 | A1* | 7/2008 | Teo ......................... | G01S 17/50 356/614 |
| 2008/0204413 | A1* | 8/2008 | Wu ....................... | G06F 3/0383 345/161 |
| 2009/0160774 | A1* | 6/2009 | Lee ..................... | G06F 3/03543 345/166 |
| 2009/0160808 | A1* | 6/2009 | Wu ..................... | G06F 3/03547 345/173 |
| 2009/0195505 | A1 | 8/2009 | Chen | |

FOREIGN PATENT DOCUMENTS

| | | |
|---|---|---|
| TW | 535096 | 6/2003 |
| TW | 201117048 | 5/2011 |
| TW | 201234221 | 8/2012 |

* cited by examiner

*Primary Examiner* — Joseph Feild
*Assistant Examiner* — Chineyere Wills-Burns
(74) *Attorney, Agent, or Firm* — Winston Hsu; Scott Margo

(57) ABSTRACT

An object navigating apparatus, which comprises: a sensing apparatus, for sensing an object; and a control unit, for computing at least one displacement that the object is relative to the sensing apparatus. The control unit increases the sensing resolution if the control unit detects the displacement is larger than a first predetermined value for continuous N times, or if the control unit detects the displacement is larger than the first predetermined time for at least N times in a first sensing time interval. The N is a positive integer larger or equals to 2.

16 Claims, 15 Drawing Sheets

OBJECT NAVIGATING APPARATUS AND OBJECT NAVIGATING METHOD

BACKGROUND OF THE INVENTION

1. Field of the Invention

The present invention relates to an object navigating apparatus and an object navigating method, and particularly relates to an object navigating apparatus and an object navigating method which can adjust the sensing resolution according to the object displacement.

2. Description of the Prior Art

For an object navigating apparatus such as a touch control apparatus or a mouse, the sensing resolution indicates the sensitivity that the object navigating apparatus senses the displacement between the object and the object navigating apparatus. The sensing sensitivity can be presented in many aspects, for example, DPI (Dot Per Inch) or CPI (Count Per Inch). FIG. 1 is a schematic diagram illustrating that a prior art touch control apparatus comprises different sensing resolutions. The object navigating apparatuses $T_1$ and $T_2$ are touch control apparatuses for controlling cursors $Cr_1$ and $Cr_2$ on the screens $SC_1$ and $SC_2$. Also, the sensing resolution for the object navigating apparatuses $T_1$ is larger than which of the object navigating apparatuses $T_2$. Therefore, if a finger F has displacement D for both the object navigating apparatuses $T_1$, $T_2$, the cursor $Cr_1$ has a displacement larger than which of the cursor $Cr_2$.

However, it is inconvenient for a user if the object navigating apparatus has a fixed sensing resolution. For example, the object navigating apparatus needs a high sensing resolution if the user needs to quickly move the cursor on the screen. By this way, the user only needs to slightly move the finger on the object navigating apparatus to make the cursor have a large displacement. However, if the user wants to perform a click operation, the click operation may be wrongly determined to be a cursor moving operation if the object navigating apparatus has a high sensing resolution. Thus the accuracy for determining the click operation decreases.

Some prior arts provide a mechanism to adjust the sensing resolution according to an average moving speed for the finger in a past period of time. For example, the sensing resolution is raised if the average moving speed in a past period of time was high. On the contrary, the sensing resolution is reduced if the average moving speed in a past period of time was low. Such mechanism still has some defects. For example, if a user wants to control the cursor to have a large displacement but does not move the finger quickly enough, the sensing resolution will have no sufficient rising in time. Or, the finger moves slowly but has a sudden fast movement to cause the increasing for the sensing resolution. Such kind of cases may affect the accuracy for sensing the finger.

SUMMARY OF THE INVENTION

One objective of the present invention is to provide an object navigating method and an object navigating apparatus, which can be utilized to adjust the sensing resolution according to a value of the displacement.

Another objective of the present invention is to provide an object navigating method and an object navigating apparatus, which can adjust the sensing resolution according to time intervals between the displacements.

One embodiment of the present invention discloses an object navigating apparatus, which comprises: a sensing apparatus, for sensing an object; and a control unit, for computing at least one displacement that the object is relative to the sensing apparatus. The control unit increases the sensing resolution if the control unit detects the displacement is larger than a first predetermined value for continuous N times, or if the control unit detects the displacement is larger than the first predetermined time for at least N times in a first sensing time interval. The N is a positive integer larger or equals to 2.

Another embodiment of the present invention discloses an object navigating apparatus, which comprises: a sensing apparatus, for sensing an object; and a control unit, for computing at least one displacement that the object is relative to the sensing apparatus. The control unit decreases the sensing resolution if the control unit does not detect that the displacement is larger than a second predetermined value in a first predetermined time interval.

Another embodiment of the present invention discloses an object navigating method applied to an object navigating apparatus, which comprises: (a) utilizing a sensing apparatus to sense an object; (b) computing at least one displacement that the object is relative to the sensing apparatus; and (c) increasing the sensing resolution if it is detected that the displacement is larger than a first predetermined value for continuous N times, or if it is detected that the displacement is larger than the first predetermined time for at least N times in a first sensing time interval, wherein the N is a positive integer larger or equals to 2.

In view of above-mentioned embodiments, the sensing resolution can be adjusted according to the value of the displacement. Additionally, the sensing resolution can be adjusted further according to the time interval between the displacements. Via these mechanisms, the user can utilize a larger sensing resolution to sense when the user wants to perform a fast moving (i.e. large and frequent displacements are generated), such that it is more convenient for the user to operate the apparatus. On the contrary, the user can utilize a smaller sensing resolution to sense when the user wants to perform a slow moving (i.e. small and frequent displacements are generated), such that the location determining for the object can be more accurate and the user can easily perform the click operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
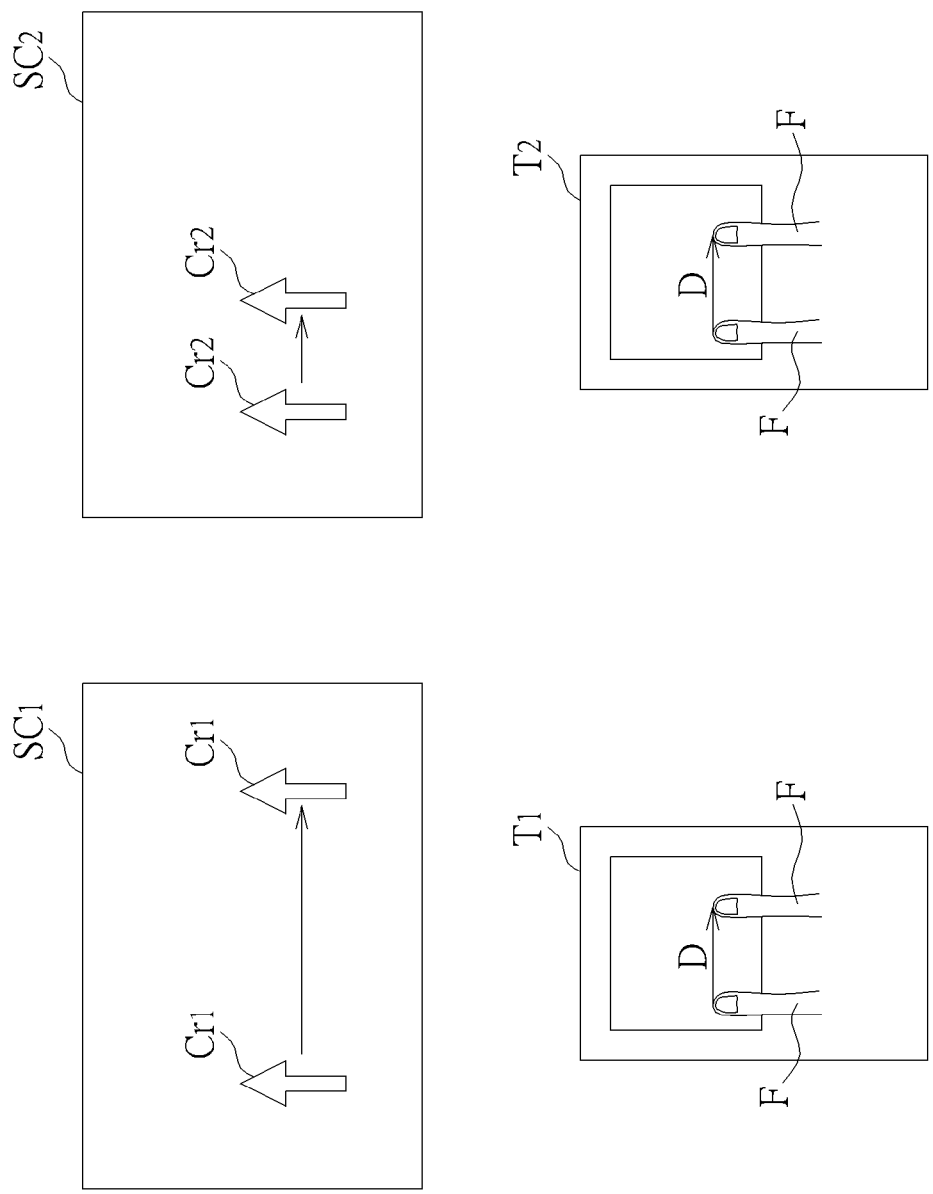
FIG. 1 is a schematic diagram illustrating that a prior art touch control apparatus comprises different sensing resolutions.
Figure 2:
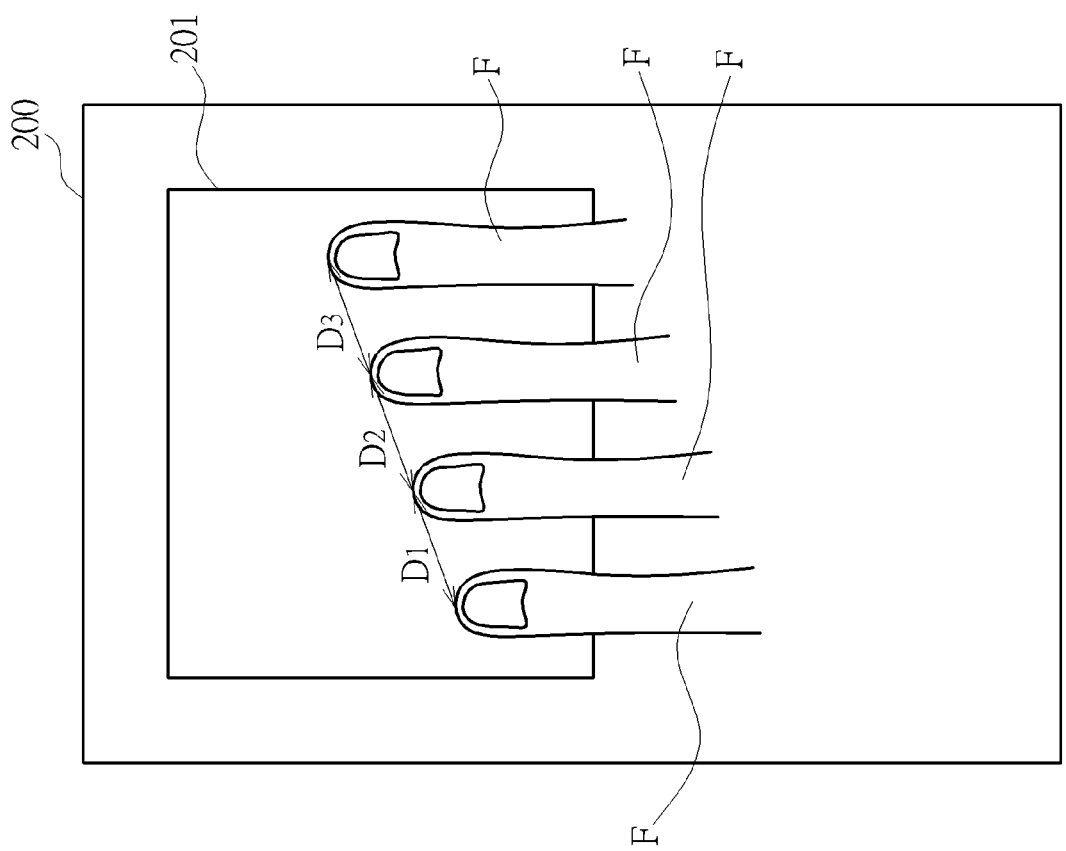
FIG. 2 and FIG. 3 are schematic diagrams illustrating that the object have a plurality of displacements relative to the touch control apparatus.
Figure 3:
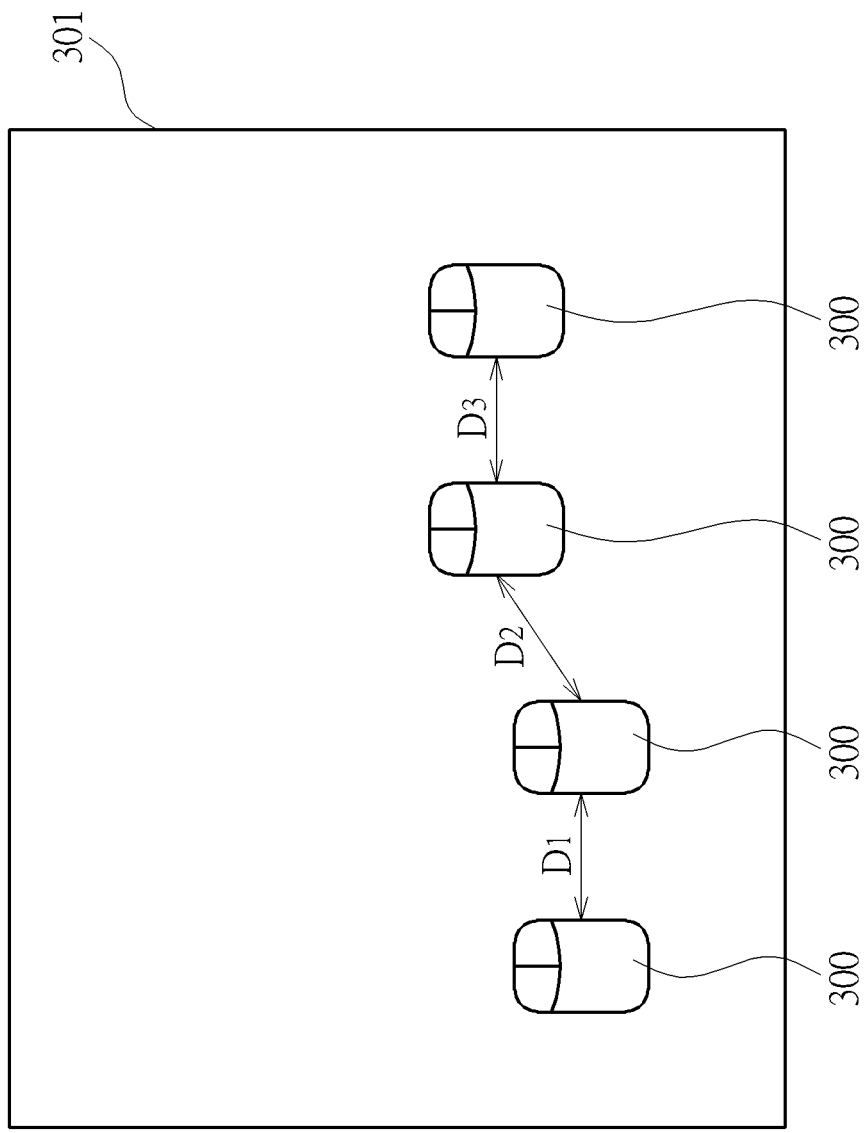

The concept of the present invention will be described as below to explain the present invention. In each embodiment, the displacement indicates the displacement that the object navigating apparatus is relative to the object. Such displacement has different meanings when the object navigating apparatus is a touch control apparatus or a mouse. In FIG. 2, the object navigating apparatus is a touch control apparatus 200 comprising a sensing apparatus 201 (in this embodiment, a sensing surface). The user can utilize an object, such as a finger F, to move on the sensing apparatus 201 to control the cursor on the screen or to perform other commands. In this example, the displacement indicates displacements $D_1$, $D_2$, $D_3$ that the finger F is relative to the sensing apparatus 201. In FIG. 3, the object navigating apparatus is a mouse 300 having a sensing apparatus provided below, to sense the displacement that the mouse 300 is relative to the object (in this example, a surface 301). The surface 301 can be a desk-top or a surface for any object. In this example, the displacement indicates displacements $D_1$, $D_2$, $D_3$ that the mouse 303 is relative to the surface 301.

FIG. 4 to FIG. 11 are schematic diagrams illustrating object navigating methods according to different embodiments of the present invention. Please note the following embodiments may utilize the same name for the parameters in each embodiment, but it does not mean that these parameters are the same. The names of parameters only indicate the relations between each parameter. For example, first predetermined values $D_{p1}$ are utilized in the embodiments of FIG. 4 and FIG. 8, but it does not mean that the first predetermined values $D_{p1}$ in FIG. 4 and FIG. 8 have the same values. Now please refer to FIG. 4, if it is detected three continuous displacements $D_1$, $D_2$, $D_3$ are larger than the first predetermined value $D_{p1}$, the sensing resolution of the object navigating apparatus is increased (in FIG. 4, the symbol $U_1$ is utilized to indicate the operation for increasing the sensing resolution). In one embodiment, the time interval between the generation of displacements is further referred to determine whether the sensing resolution should be adjusted or not. In this embodiment, the time intervals $T_a$, $T_b$ between the displacements $D_1$, $D_2$, $D_3$ are smaller than the predetermined time interval $T_1$ and the displacements $D_1$, $D_2$, $D_3$ are all larger than the first predetermined value $D_{p1}$, thus the operation for increasing the sensing resolution is performed. However, displacements $D_1$, $D_2$, $D_3$ are all larger than the first predetermined value $D_{p1}$ in FIG. 6, but the operation for increasing the sensing resolution is not performed since the time intervals $T_x$, $T_y$ are all larger than the predetermined time interval $T_1$.

Please note the operation for increasing the sensing resolution is not limited to the condition that continuous larger displacements exist. Please refer to FIG. 5, three displacements $D_1$, $D_3$, $D_5$ are larger than the first predetermined value $D_{p1}$ exist but are non-continuous, since two displacements $D_2$, $D_4$ exist there between. In such case, the operation for increasing the sensing resolution is still performed. Please note three displacements are utilized as examples to explain the embodiments for either FIG. 4 or FIG. 5, but it does not mean the number for the displacements must be 3. The number for the displacements can be 2 or more than 3. Accordingly, the embodiments in FIG. 4 and FIG. 5 can be summarized as: increase the sensing resolution if it is detected that the displacement is larger than a first predetermined value for continuous N times, or it is detected that the displacement is larger than the first predetermined time for at least N times in a first sensing time interval. N is a positive integer equal or larger than 2. Additionally, in one embodiment, the value which the resolution is desired to be adjusted to is determined according to the speed that the object is relative to the sensing apparatus. If the speed is fast, the sensing resolution is adjusted to a higher sensing resolution. On the contrary, the sensing resolution is adjusted to a lower sensing resolution if the speed is slow.

Figure 7:
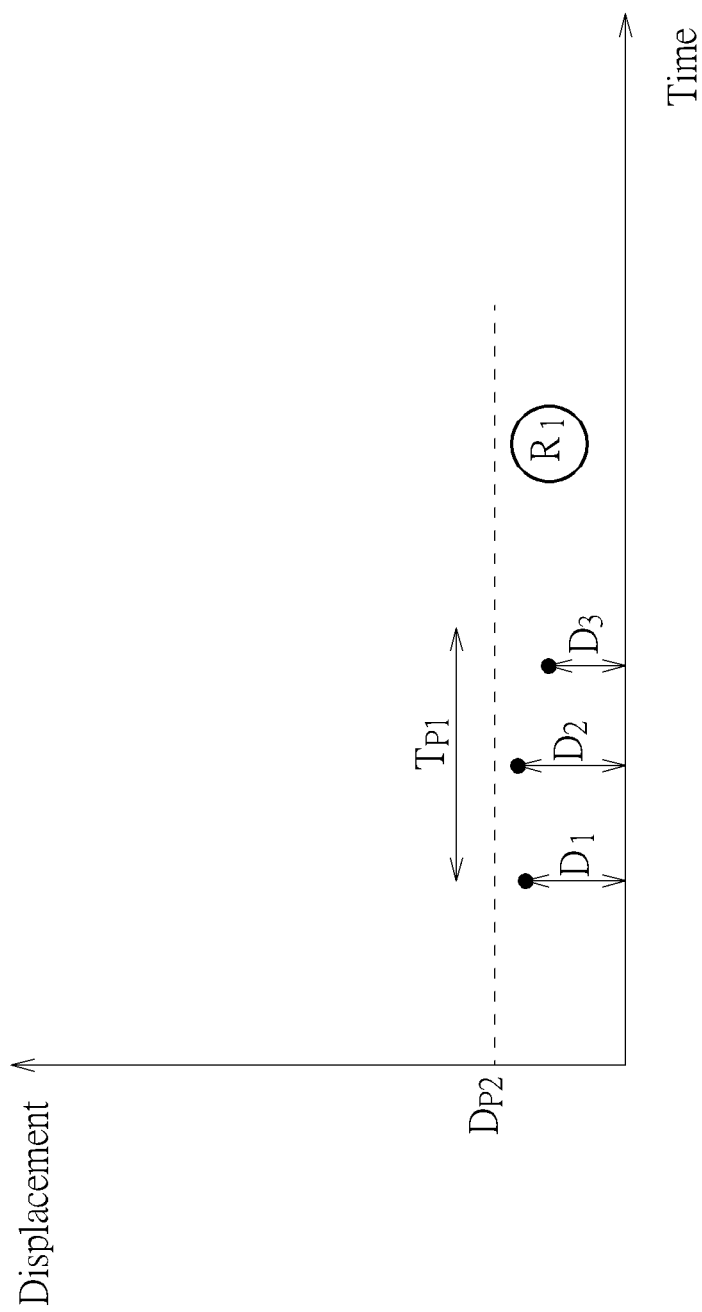

Please refer to FIG. 7, which is a schematic diagram illustrating how an object navigating method according to the present invention decreases the sensing resolution. As shown in FIG. 7, the sensing resolution is decreased if it is not detected that the displacement is larger than a second predetermined value $D_{p2}$ in a first predetermined time interval $T_{p1}$. The symbol operation $R_1$ in FIG. 7 indicates the operation for decreasing the sensing resolution. The second predetermined value $D_{p2}$ can be the same as the first predetermined value $D_{p1}$, but also can be different. In one embodiment, the value which the sensing resolution is desired to be decreased to is determined according to the speed that the object is relative to the sensing apparatus. If the speed is fast, the sensing resolution is adjusted to a higher sensing resolution. On the contrary, the sensing resolution is adjusted to a lower sensing resolution if the speed is slow. However, it is not limited.

Figure 4:
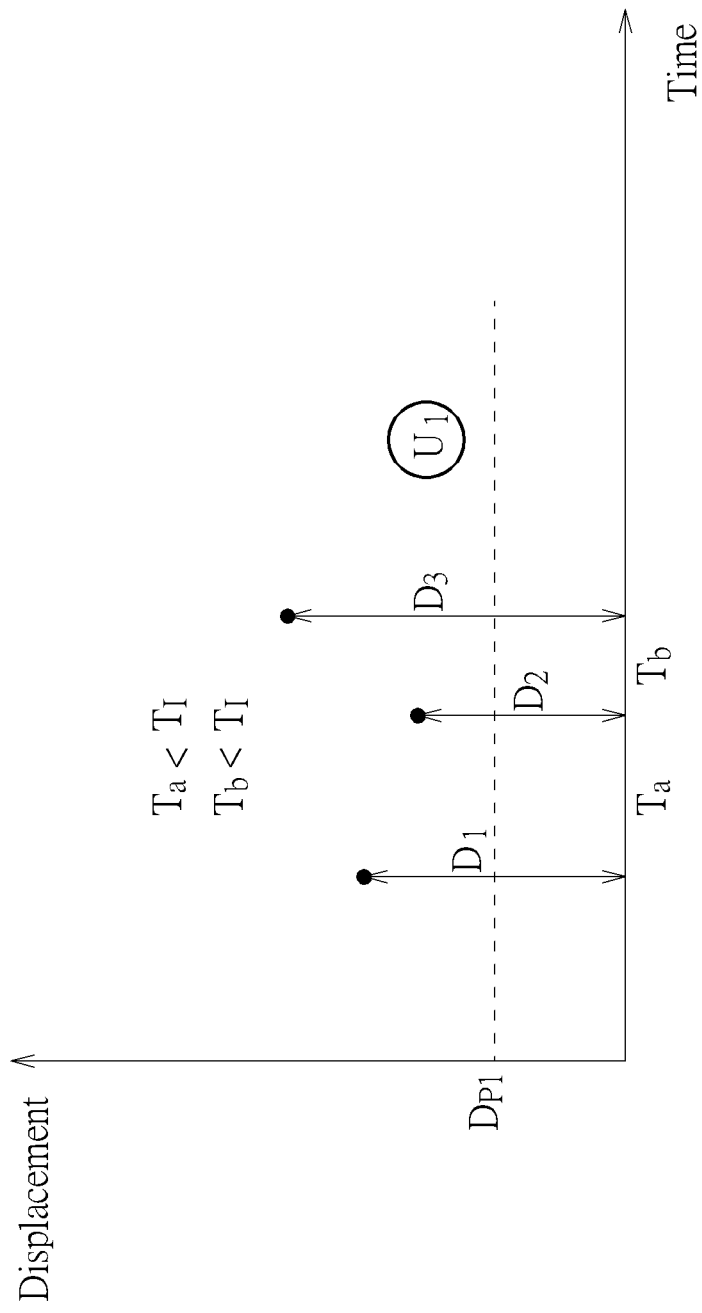
FIG. 4 to FIG. 11 are schematic diagrams illustrating object navigating methods according to different embodiments of the present invention.
Figure 5:
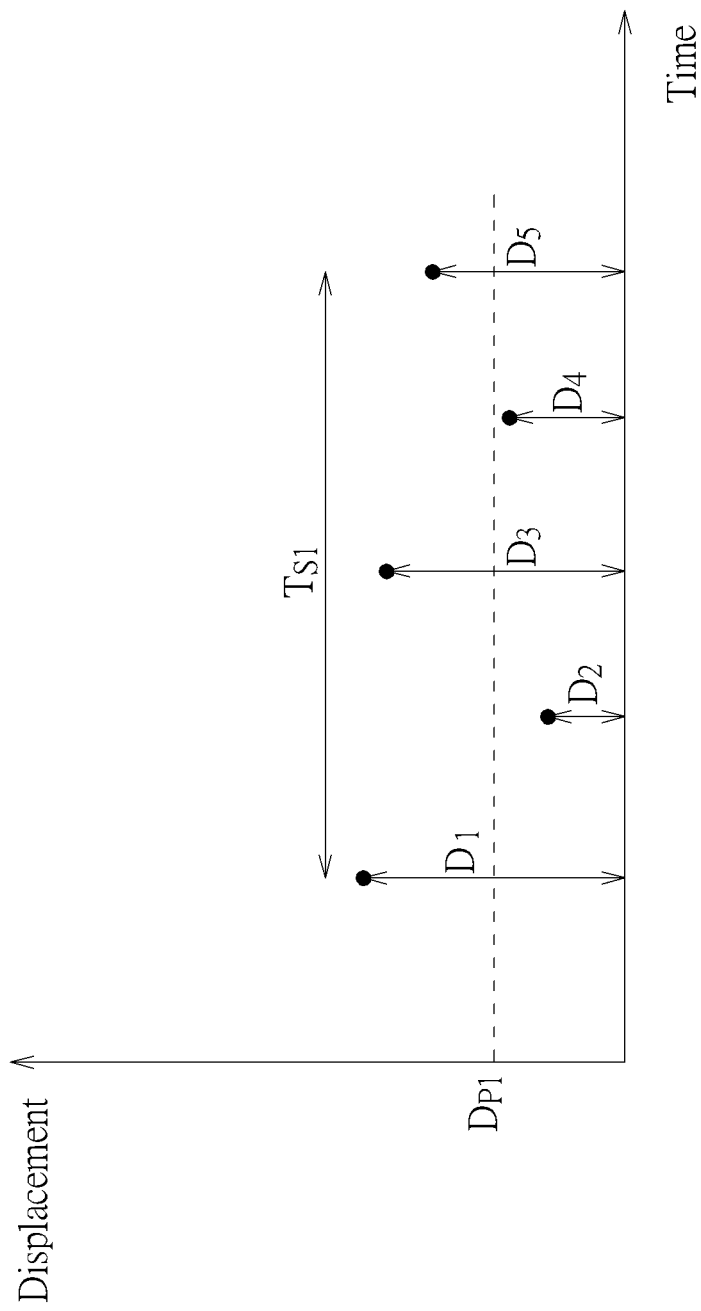
Figure 6:
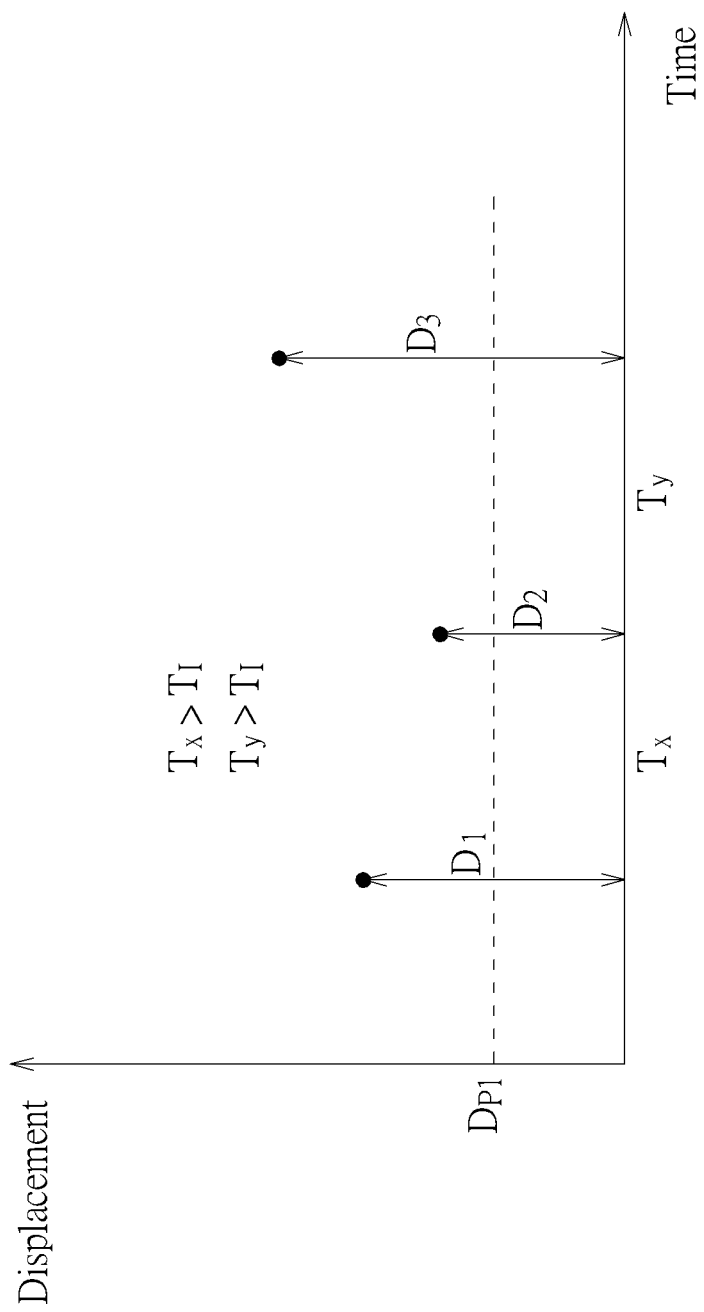
Figure 8:
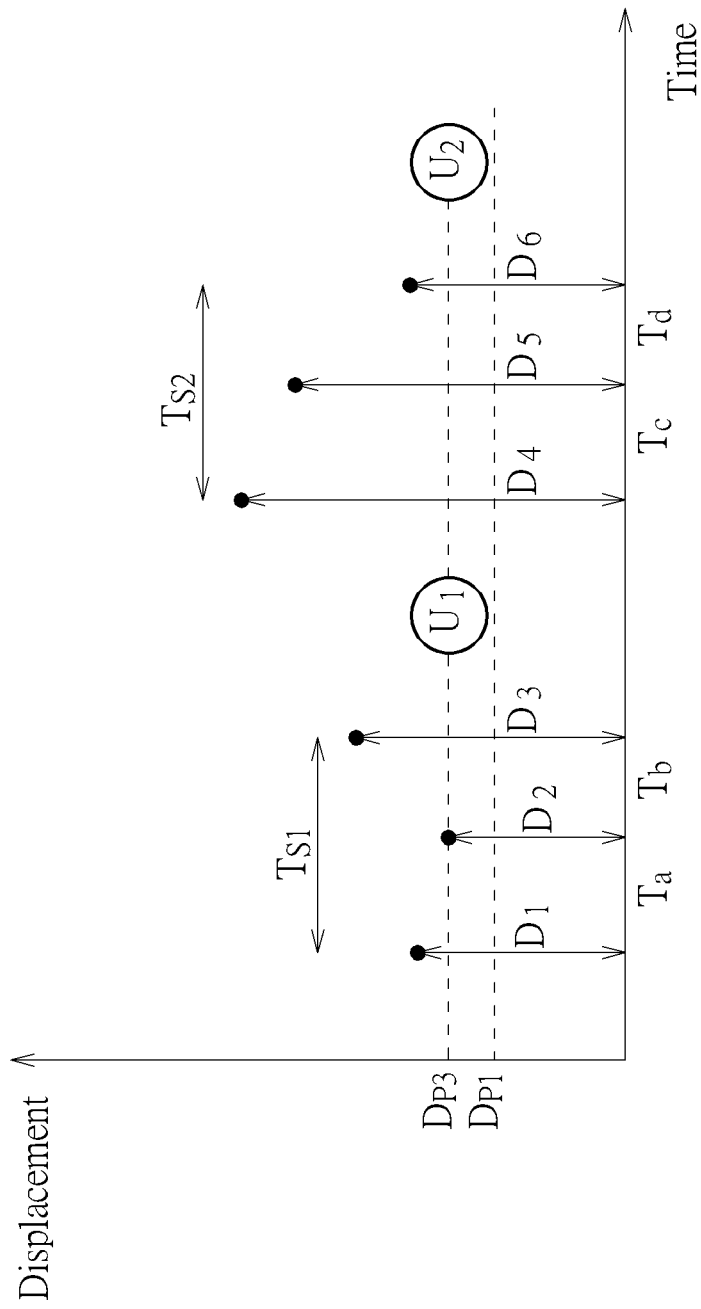

The mechanism described in FIG. 4 can be repeatedly utilized. As shown in FIG. 8, if three continuous displacements $D_1$, $D_2$, $D_3$ are detected to be larger than the first predetermined value $D_{p1}$, a first sensing resolution increasing operation $U_1$ is performed. After that, if three continuous displacements $D_4$, $D_5$, $D_6$ are detected to be larger than the third predetermined value $D_{p3}$, a second sensing resolution increasing operation $U_2$ is performed. Please note the standards for two different sensing resolution increasing operations are not necessarily the same. For example, three continuous displacements are detected to be larger than the first predetermined value and the sensing resolution increasing operation for the first time is accordingly performed, and then five (rather than three) continuous displacements are detected to be larger than the third predetermined value and the sensing resolution increasing operation for the second time is accordingly performed. The first predetermined value $D_{p1}$ and the third predetermined value $D_{p3}$ can be the same, but also can be different.

The mechanism that determining if the sensing solution should be increased based on the time intervals between the generations for the displacements can also be applied to the embodiment of FIG. 8. That is, the sensing resolution increasing operation for the first time $U_1$ is performed only when the time intervals $T_a$, $T_b$ are smaller than the first predetermined time interval $T_{p1}$, and the sensing resolution increasing operation for the second time $U_2$ is performed only when the time intervals $T_c$, $T_d$ are smaller than the second predetermined time interval $T_{p2}$. The first predetermined time interval $T_{p1}$ and the second predetermined time interval $T_{p2}$ can be the same, but also can be different.

As above-mentioned, the triggering for the sensing resolution increasing operations $U_1$, $U_2$ are not limited to be triggered by that three continuous displacements $D_1$, $D_2$, $D_3$ are larger than the first predetermined value $D_{p1}$. The triggering can also be that three displacements larger than the first predetermined value $D_{p1}$ exist in a sensing time interval. Such triggering mechanism can be applied to the following embodiments. For example, the sensing resolution increasing operations $U_1$, $U_2$ in FIG. 8 can be triggered depending on if three displacements larger than the first predetermined value $D_{p1}$ exist in the first sensing time interval $T_{s1}$ and the second sensing time interval $T_{s2}$.

Figure 9:
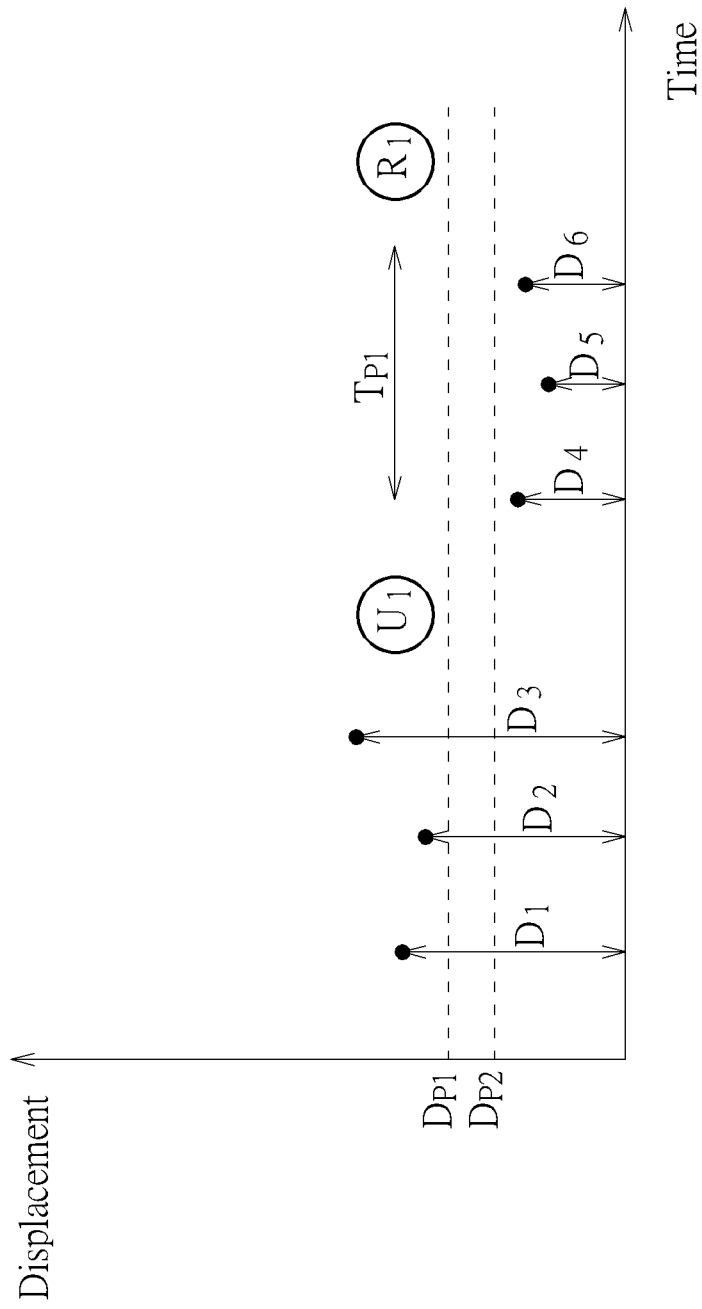

In the embodiment of FIG. 9, the sensing resolution increasing operations $U_1$ is performed after three continuous displacements $D_1$, $D_2$, $D_3$ larger than the first predetermined value $D_{p1}$ are detected. After that, if no displacement larger than a second predetermined value $D_{p2}$ is detected in the first predetermined time interval $T_{p1}$, the sensing resolution decreasing operations $R_1$ is performed. In such embodiment, the second predetermined value $D_{p2}$ and the first predetermined value $D_{p1}$ can be the same, but also can be different.

Figure 10:
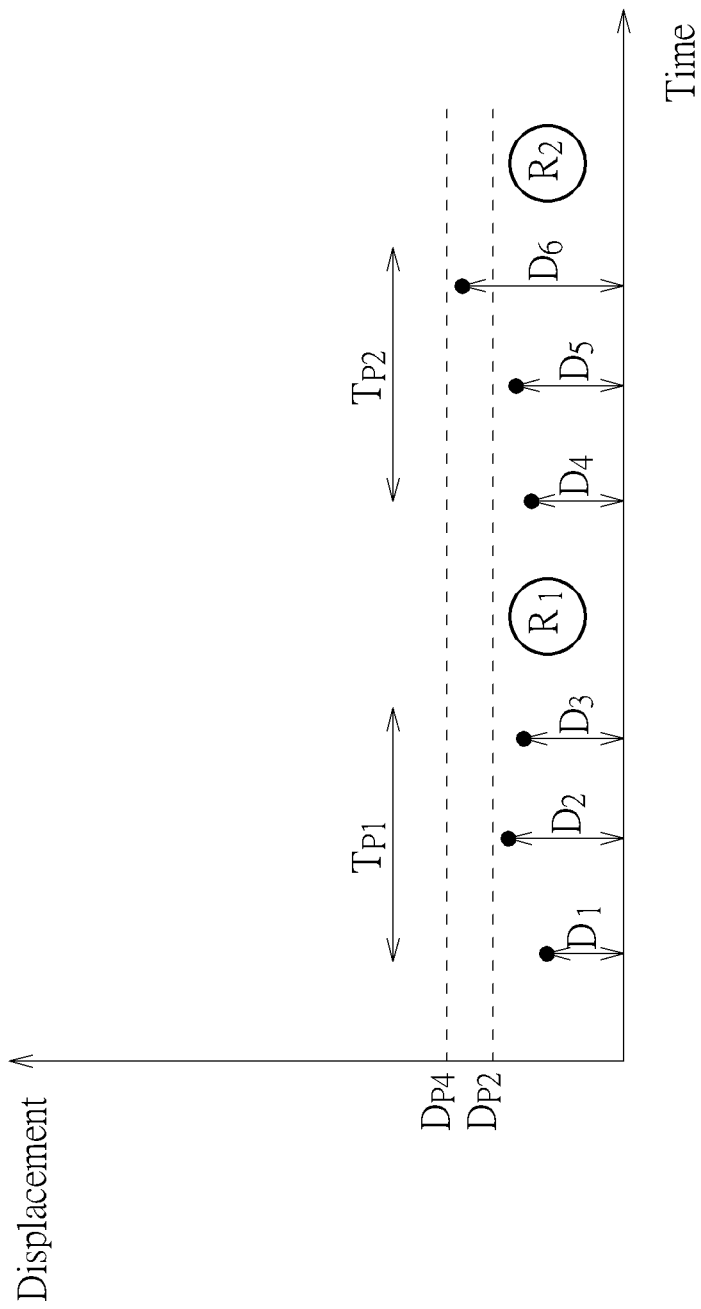

In the embodiment of FIG. 10, if no displacement larger than a second predetermined value $D_{p2}$ is detected in a first predetermined time interval $T_{p1}$, the sensing resolution decreasing operation for the first time $R_1$ is performed. After that, if no displacement larger than a fourth predetermined value $D_{p4}$ is detected in a second predetermined time interval $T_{p2}$, the sensing resolution decreasing operation for the second time $R_2$ is performed. In such embodiment, the first predetermined time interval $T_{p1}$ and the second predetermined time interval $T_{p2}$ can be the same, but also can be different. The second predetermined value $D_{p2}$ and the fourth predetermined value $D_{p4}$ can be the same, but also can be different.

Figure 11:
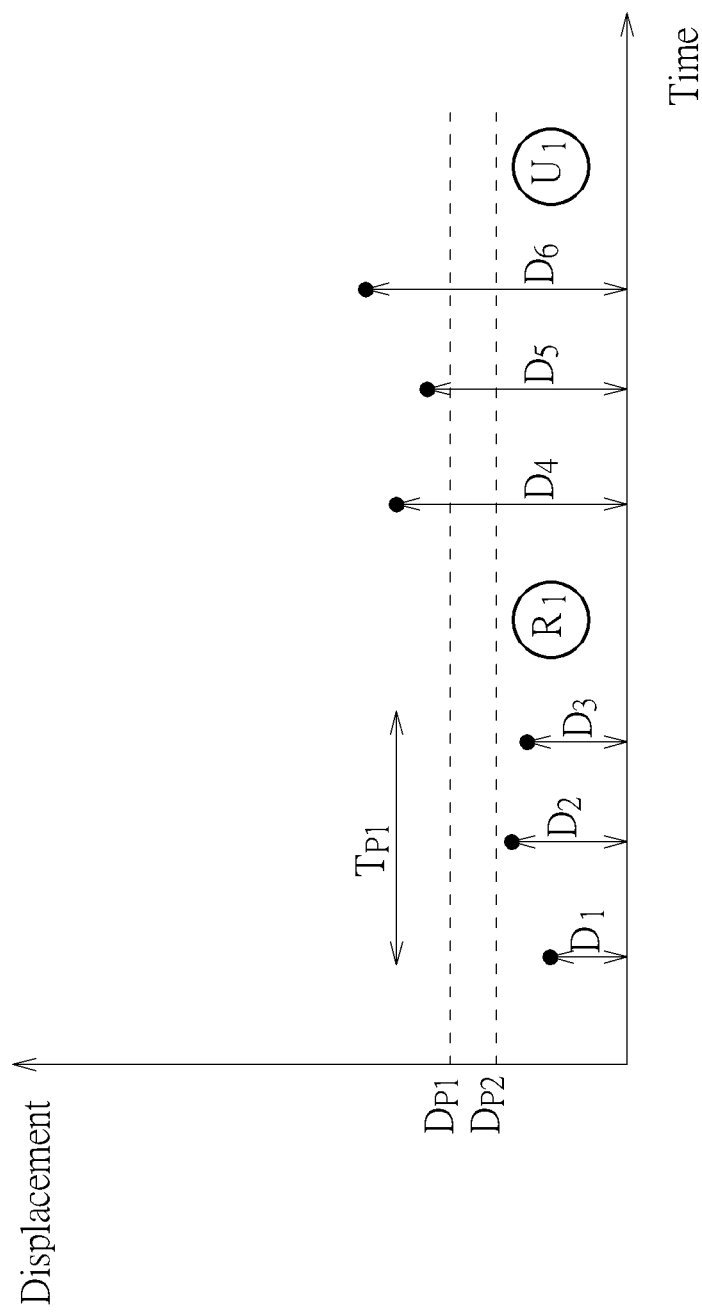

In the embodiment of FIG. 11, if no displacement larger than a second predetermined value $D_{p2}$ is detected in a first predetermined time interval $T_{p1}$, the sensing resolution decreasing operation for the first time $R_1$ is performed. Then, the sensing resolution increasing operations $U_1$ is performed after three continuous displacements $D_1$, $D_2$, $D_3$ larger than the first predetermined value $D_{p1}$ are detected. The second predetermined value $D_{p2}$ and the first predetermined value $D_{p1}$ can be the same, but also can be different.

Figure 12:
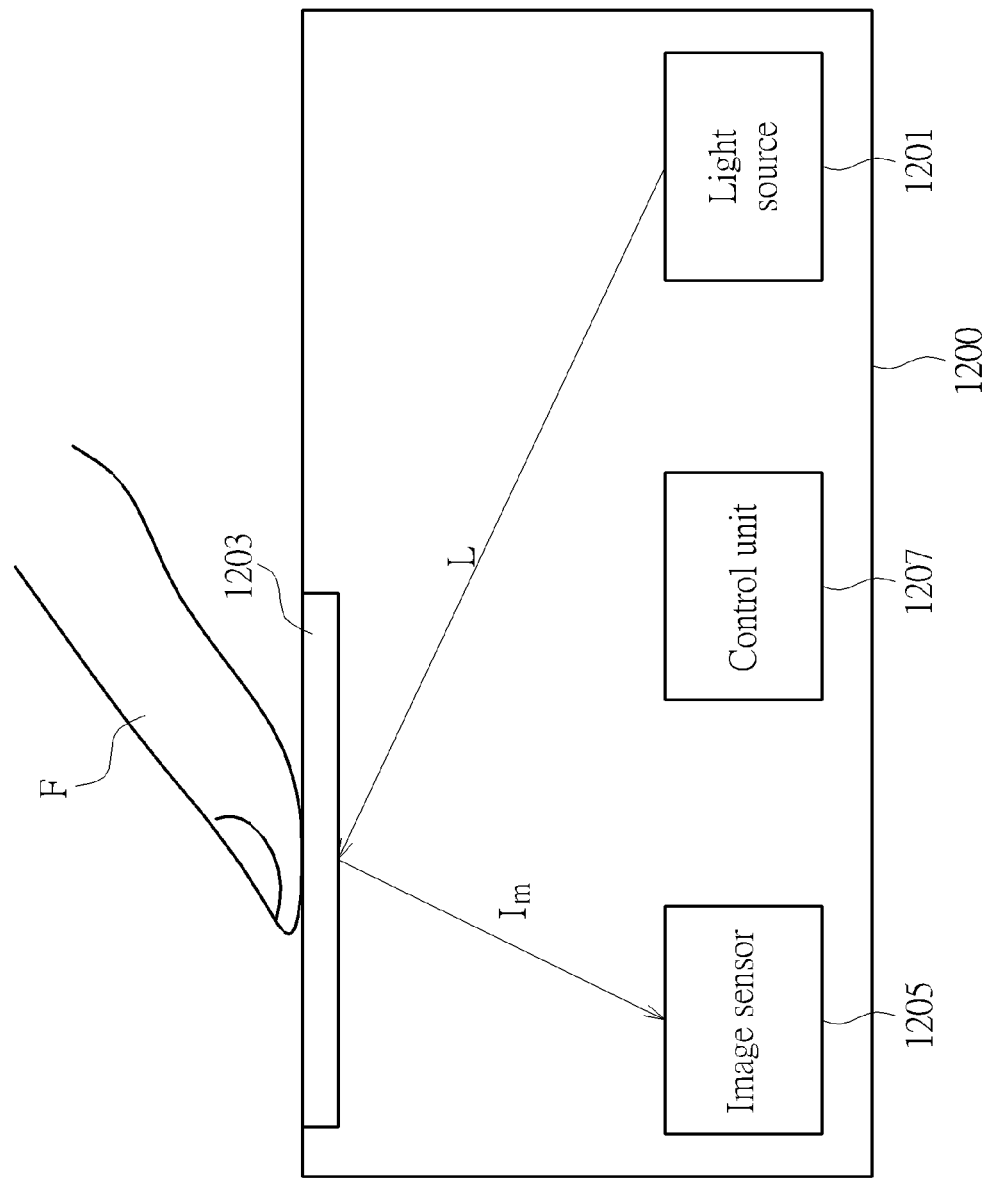
FIG. 12 is a schematic diagram illustrating an optical touch control apparatus utilizing the above-mentioned object navigating methods.

FIG. 12 is a schematic diagram illustrating an optical touch control apparatus 1200 utilizing the above-mentioned object navigating methods. As shown in FIG. 12, the optical touch control apparatus 1200 comprises a light source 1201, a sensing apparatus 1203 such as a sensing surface, an image sensor 1205 and a control unit 1207. The light source 1201 emits light L to the object such as the finger F to generate the object image Im. The image sensor 1205 computes the location for the object according to the object image Im, and the control unit 1207 computes the location for the object. After computing the displacement, the above-mentioned object navigating method can be performed. Please note the object navigating method of the present invention can also be applied to touch control apparatuses of other types, such as a capacitive touch control apparatus. Accordingly, the light source 1201 and the image sensor 1205 can be removed for a touch control apparatuses of another type, and only the sensing apparatus for sensing the location of the object and the control unit for computing displacements of the object are left.

Figure 13:
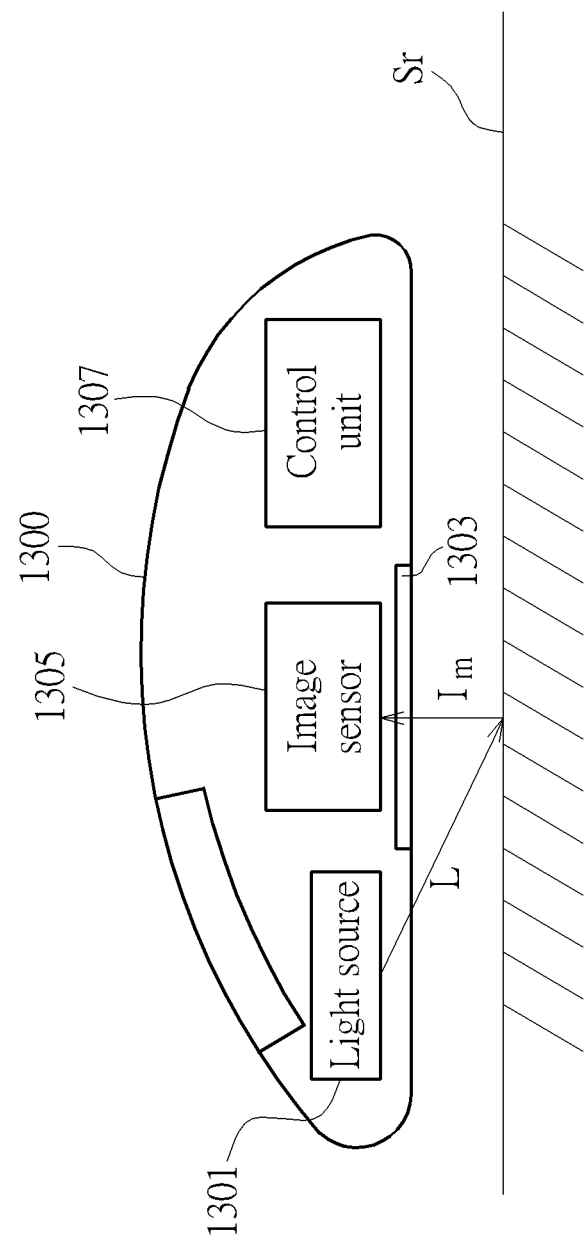
FIG. 13 is a schematic diagram illustrating an optical mouse utilizing the above-mentioned object navigating methods.

FIG. 13 is a schematic diagram illustrating an optical mouse utilizing the above-mentioned object navigating methods. As shown in FIG. 13, the optical mouse comprises a light source 1301, a sensing apparatus 1303, an image sensor 1305 and a control unit 1307. The light source 1301 emits the light L to an object, which is a surface Sr in this embodiment, to generate an image IM via the sensing apparatus 1303. The image sensor 1305 computes the location for the object according to the object image Im, and the control unit 1307 computes the displacement of the optical mouse 1300 according to the object image Im. After computing the displacement, the above-mentioned object navigating method can be performed.

Figure 14:
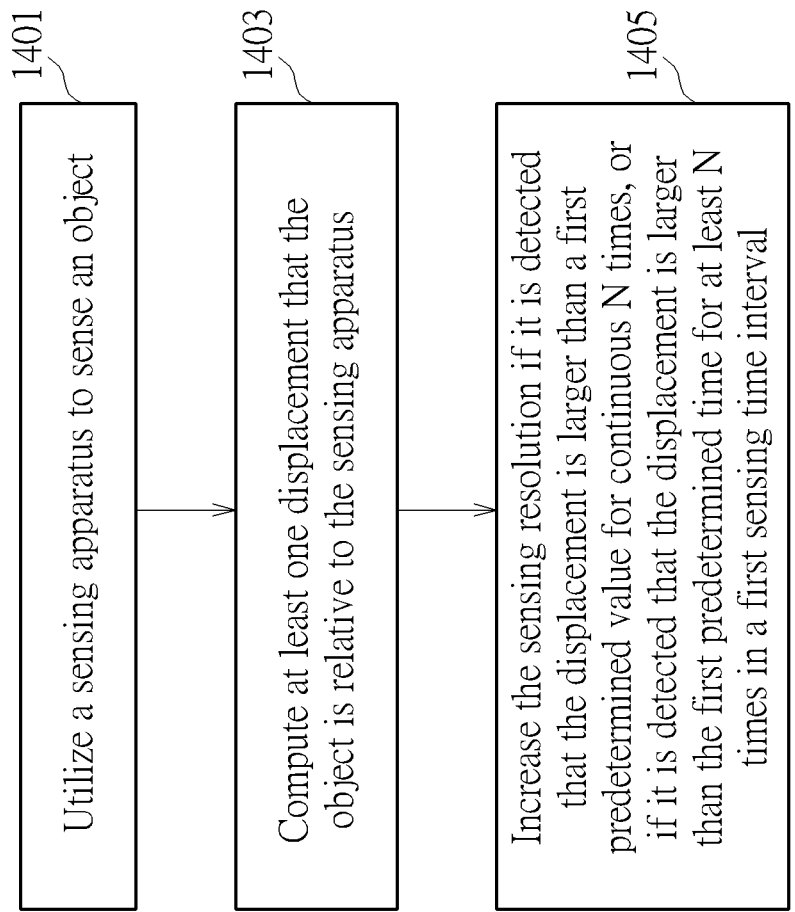
FIG. 14 and FIG. 15 are flow charts illustrating object navigating methods according to embodiments of the present invention.
Figure 15:
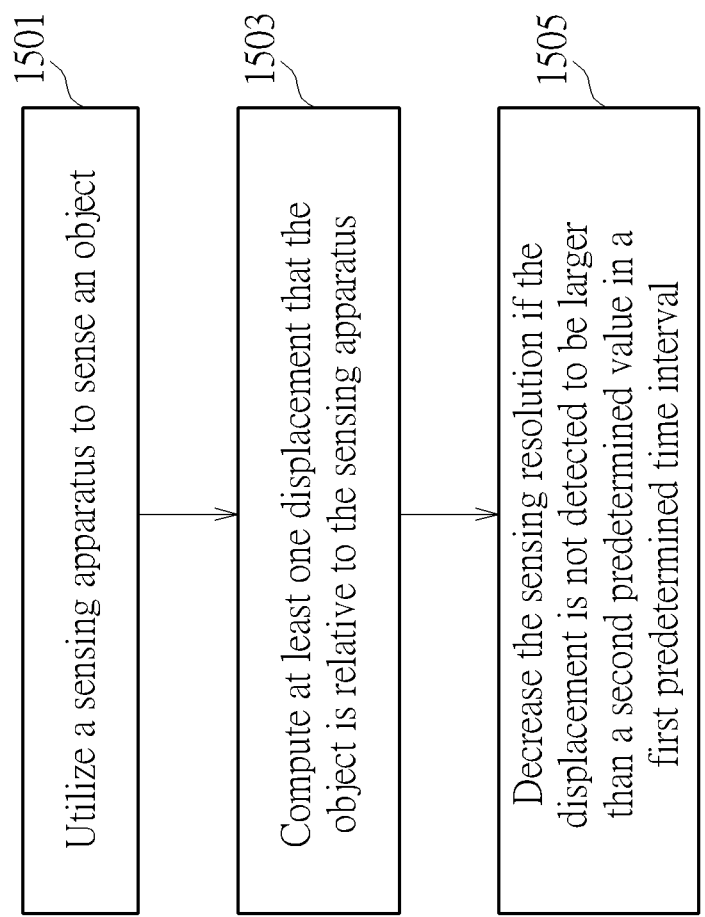

In view of above-mentioned embodiments, the flow charts in FIG. 14 and FIG. 15 can be acquired. FIG. 14 corresponds to the embodiment in FIG. 4, and FIG. 15 corresponds to the embodiment in FIG. 7.

FIG. 14 comprises the following steps:

Step 1401

Utilize a sensing apparatus (ex. 1203 in FIG. 12 or 1303 in FIG. 13) to sense an object (ex. finger F in FIG. 12 or surface Sr in FIG. 13).

Step 1403

Compute at least one displacement that the object is relative to the sensing apparatus.

Step 1405

Increase the sensing resolution if it is detected that the displacement is larger than a first predetermined value for continuous N times, or if it is detected that the displacement is larger than the first predetermined time for at least N times in a first sensing time interval. The N is a positive integer larger or equals to 2.

FIG. 15 comprises the following steps:

Step 1501

Utilize a sensing apparatus (ex. 1203 in FIG. 12 or 1303 in FIG. 13) to sense an object (ex. finger F in FIG. 12 or surface Sr in FIG. 13).

Step 1503

Compute at least one displacement that the object is relative to the sensing apparatus.

Step 1505

Decrease the sensing resolution if the displacement is not detected to be larger than a second predetermined value in a first predetermined time interval.

Other detail steps can be acquired according to above-mentioned embodiments, thus are omitted for brevity here.

In view of above-mentioned embodiments, the sensing resolution can be adjusted according to the value of the displacement. Additionally, the sensing resolution can be adjusted further according to the time interval between the displacements. Via these mechanisms, the user can utilize a larger sensing resolution to sense when the user wants to perform a fast moving (i.e. large and frequent displacements are generated), such that it is more convenient for the user to operate the apparatus. On the contrary, the user can utilize a smaller sensing resolution to sense when the user wants to perform a slow moving (i.e. small and frequent displacements are generated), such that the location determining for the object can be more accurate and the user can easily perform the click operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object navigating apparatus, comprising:
   a sensing apparatus, for sensing an object; and
   a control unit, for continuously computing a plurality of displacements that the object is relative to the sensing apparatus during a first sensing time interval;
   wherein the control unit increases the sensing resolution when at least N displacements of the plurality of displacements are larger than a first predetermined value during the first sensing time interval;
   where N is a positive integer greater than 2.

2. The object navigating apparatus of claim 1, wherein the control unit increases the sensing resolution of the object navigating apparatus when the control unit detects the displacement is larger than the first predetermined value for continuous N times and time intervals between each of the N displacements is not larger than a predetermined time interval.

3. The object navigating apparatus of claim 1, wherein the control unit increases the sensing resolution of the object navigating apparatus again if the control unit detects the displacement is larger than a third predetermined value for continuous M times, or if the control unit detects the displacement is larger than the third predetermined time for at least M times in a second sensing time interval, after the control unit increases the sensing resolution; where M is a positive integer greater than or equal to 2.

4. The object navigating apparatus of claim 3, wherein M is the same as N, or the third predetermined value is the same as the first predetermined value.

5. The object navigating apparatus of claim 1, wherein the control unit determines a value which the sensing resolution is desired to be increased to according to a speed that the object is relative to the object navigating apparatus.

6. The object navigating apparatus of claim 1, wherein the control unit decreases the sensing resolution of the object navigating apparatus if the control unit does not detect that the displacement is larger than a second predetermined value in a first predetermined time interval.

7. The object navigating apparatus of claim 6, wherein the control unit decreases the sensing resolution of the object navigating apparatus again, if the control unit does not detect that the displacement is larger than a fourth predetermined value in a second predetermined time interval, after the control unit decreases the sensing resolution of the object navigating apparatus.

8. The object navigating apparatus of claim 6, wherein the control unit determines a value which the sensing resolution is desired to be decreased to according to a speed that the object is relative to the object navigating apparatus.

9. An object navigating method, applied to an object navigating apparatus, comprising:
   (a) utilizing a sensing apparatus to sense an object;
   (b) continuously computing a plurality of displacements that the object is relative to the sensing apparatus during a first sensing time interval; and
   (c) increasing the sensing resolution when at least N displacements of the plurality of displacements are larger than a first predetermined value during the first sensing time interval, wherein N is a positive integer greater than 2.

10. The object navigating method of claim 9, wherein the step(c) increases the sensing resolution of the object navigating apparatus when it is detected that the displacement is larger than the first predetermined value for continuous N times and time intervals between each of the N displacements is not larger than a predetermined time interval.

11. The object navigating method of claim 9, further comprising:
   increasing the sensing resolution of the object navigating apparatus again if it is detected that the displacement is larger than a third predetermined value for continuous M times, or if it is detected that the displacement is larger than the third predetermined time for at least M times in a second sensing time interval, after the sensing resolution is increased;
   wherein M is a positive integer greater than or equal to 2.

12. The object navigating method of claim 11, wherein M is the same as N, or the third predetermined value is the same as the first predetermined value.

13. The object navigating method of claim 9, further comprising:
   determining a value which the sensing resolution is desired to be increased to according to a speed that the object is relative to the object navigating method.

14. The object navigating method of claim 9, further comprising:
   decreasing the sensing resolution of the object navigating apparatus if no displacement of the plurality of displacements is detected as being larger than a second predetermined value in a first predetermined time interval.

15. The object navigating method of claim 14, further comprising:
   decreasing the sensing resolution of the object navigating apparatus again, if no displacement of the plurality of displacements is detected as being larger than a fourth predetermined value in a second predetermined time interval, after the sensing resolution is decreased.

16. The object navigating method of claim 14, further comprising:
   determining a value which the sensing resolution is desired to be decreased to according to a speed that the object is relative to the object navigating apparatus.

* * * * *